(12) United States Patent
Tan

(10) Patent No.: US 11,366,018 B1
(45) Date of Patent: Jun. 21, 2022

(54) WIRELESS DETECTING THERMOMETER FOR BARBECUE

(71) Applicant: SHENZHEN HONGKANG INTERNATIONAL ELECTRONIC TECHNOLOGY CO., LTD., Shenzhen (CN)

(72) Inventor: Zhiling Tan, Nanchang (CN)

(73) Assignee: SHENZHEN HONGKANG INTERNATIONAL ELECTRONIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/407,210

(22) Filed: Aug. 20, 2021

(30) Foreign Application Priority Data

May 27, 2021 (CN) .......................... 202110587259.0

(51) Int. Cl.
| | |
|---|---|
| *G01K 13/00* | (2021.01) |
| *G01K 1/024* | (2021.01) |
| *G01K 7/16* | (2006.01) |
| *A47J 37/07* | (2006.01) |

(52) U.S. Cl.
CPC .............. *G01K 1/024* (2013.01); *G01K 7/16* (2013.01); *G01K 13/00* (2013.01); *A47J 37/0786* (2013.01); *A47J 2202/00* (2013.01)

(58) Field of Classification Search
CPC .. A47J 36/321; A47J 2202/00; A47J 37/0786; A47J 27/002; A47J 36/2483; G01K 13/00; G01K 1/024; G01K 7/16; G01K 2207/06; G01K 13/20; G01K 7/42; G01K 2207/02; G01K 1/02; G01K 1/14
See application file for complete search history.

(56) References Cited

U.S. PATENT DOCUMENTS

| | | | |
|---|---|---|---|
| 8,844,350 B2* | 9/2014 | Yamaguchi | G01F 1/00 |
| | | | 73/204.26 |
| 10,378,966 B2* | 8/2019 | Koetz | G01K 11/265 |
| 10,969,572 B2* | 4/2021 | Churovich | G01K 1/02 |

(Continued)

FOREIGN PATENT DOCUMENTS

| | | | |
|---|---|---|---|
| CN | 2521841 Y | * | 11/2002 |
| CN | 203970358 U | * | 12/2014 |

(Continued)

*Primary Examiner* — Gail Kaplan Verbitsky

(57) ABSTRACT

The present disclosure relates to temperature detection equipment and in particular to a wireless detecting thermometer for barbecue, which comprises a host and a temperature probe, wherein the host is provided with a storage slot and a control circuit board integrated with a Bluetooth adapter, a central processing unit and a digital display; the temperature probe comprises a metal casing, a temperature-sensing resistor and a temperature measuring chip; the temperature measuring chip is connected to a Bluetooth transceiver signally communicated with the Bluetooth adapter in the host. A Bluetooth protocol is applied for data transmission to get rid of a data cable, so that the temperature probe can be put into an oven, thus to improve the convenience of the product. Besides, the temperature data and the power data are shown on the digital display, which is convenient to observe, and the temperature detection is convenient.

9 Claims, 8 Drawing Sheets

(56) References Cited

U.S. PATENT DOCUMENTS

| | | | |
|---|---|---|---|
| 2003/0202558 A1* | 10/2003 | Chung | G01K 1/024 374/155 |
| 2006/0203878 A1* | 9/2006 | Pearl | G01K 1/026 374/141 |
| 2012/0006718 A1* | 1/2012 | Waldrop | B65B 5/04 206/557 |
| 2013/0301673 A1* | 11/2013 | Mobley | G01K 3/04 374/102 |
| 2015/0037471 A1* | 2/2015 | Fung | A23L 5/10 426/231 |
| 2017/0296142 A1* | 10/2017 | Wodecki | A61B 8/4433 |
| 2017/0329125 A1* | 11/2017 | Churovich | G02B 23/2469 |
| 2019/0195700 A1* | 6/2019 | Ge | G01K 7/24 |
| 2019/0339133 A1* | 11/2019 | Pulvermacher | H02J 7/025 |
| 2020/0080899 A1* | 3/2020 | Smith | G01K 13/00 |
| 2020/0096393 A1* | 3/2020 | Lion | G01K 1/024 |
| 2020/0129006 A1* | 4/2020 | Nivala | G08B 21/182 |
| 2020/0141813 A1* | 5/2020 | Nivala | G01K 13/00 |
| 2020/0214494 A1* | 7/2020 | Chu | A47J 36/32 |
| 2020/0225095 A1* | 7/2020 | Burkhardt | G01K 1/14 |
| 2020/0357260 A1* | 11/2020 | Allen, Sr. | G08B 21/182 |
| 2021/0231503 A1* | 7/2021 | Wu | G01K 1/08 |
| 2021/0304222 A1* | 9/2021 | Gratianne | G06Q 30/0185 |
| 2022/0049992 A1* | 2/2022 | Nivala | G01K 1/024 |

FOREIGN PATENT DOCUMENTS

| | | | | |
|---|---|---|---|---|
| CN | 205940778 U | * | 2/2017 | |
| CN | 206700152 U | * | 12/2017 | |
| CN | 108496079 A | * | 9/2018 | G01N 33/497 |
| CN | 110285894 A | * | 9/2019 | |
| CN | 112465080 A | * | 3/2021 | G01K 1/024 |
| CN | 113099024 A | * | 7/2021 | |
| CN | 113280939 A | * | 8/2021 | |
| KR | 20020003730 A | * | 1/2002 | |
| WO | WO-2019012324 A1 | * | 1/2019 | G01K 1/12 |
| WO | WO-2021038528 A1 | * | 3/2021 | G01K 1/024 |
| WO | WO-2021137118 A1 | * | 7/2021 | G01K 1/024 |

* cited by examiner

WIRELESS DETECTING THERMOMETER FOR BARBECUE

TECHNICAL FIELD

The present disclosure relates to temperature detection equipment, in particular to a wireless detecting thermometer for barbecue.

RELATED ART

When barbecuing food, it is necessary to control the degree of rawness and ripeness of barbecued food. At present, people mainly rely on their experience and feeling, which often leads to the barbecued food charred outside and undercooked inside, thus to cause a great waste of food. In order to make the food fully barbecued, the temperature of the barbecued food needs to be detected. A temperature-sensing probe connected to a host through a data cable to transmit detection data is generally applied in a current barbecue thermometer; however, a restriction of the data cable makes a user have to carry the bulky host with him/her, which is inconvenient to store and carry, and the data cable cannot be put into an oven, thus it is not suitable for baking in the oven. Except for wired thermometers, there are some wireless barbecue thermometers, but this type of thermometer requires the user to download a special temperature detecting client on a smart mobile device such as a mobile phone, and then is connected to the host through the client to observe the temperature of the barbecued food. Every time the temperature is detected, the client must be reconnected to the host, and the mobile phone needs to be taken out to observe the temperature at any time, which is inconvenient to operate.

Therefore, a thermometer specially used for measuring food temperature during grilling has emerged as the times require, this type of thermometer is mainly composed of a temperature-sensing probe and a temperature detector with a display screen. When in use, the temperature-sensing probe is inserted into the food, the user can observe the temperature measured by the temperature-sensing probe and shown on the display of the temperature detector, thus to realize the detection of the internal temperature of the barbecued food, without downloading the client, and the temperature of the barbecued food can be observed in real time through the display screen. Besides, the wireless thermometer is suitable for baking in the oven.

SUMMARY

In order to overcome the above-mentioned disadvantages, the present disclosure provides a technical solution to solve the above-mentioned problems.

A wireless detecting thermometer for barbecue comprises a host and a temperature probe matched with the host, wherein the host is provided with a storage slot for accommodating the temperature probe, and a control circuit board integrated with a Bluetooth adapter, a central processing unit and a digital display. The temperature probe comprises a thermally conductive metal casing, a temperature-sensing resistor provided within the metal casing, and a temperature measuring chip connected to the temperature-sensing resistor. The temperature measuring chip is connected to a Bluetooth transceiver signally communicated with the Bluetooth adapter in the host;

a power supply device is arranged within the host for supplying power to the control circuit board, a portable battery connected to the temperature measuring chip and the Bluetooth transceiver is provided within the metal casing of the temperature probe, and the digital display is exposed on a front panel of the host.

Furthermore, a top end of the temperature probe is provided with an insulating rubber block connected to a top end of the metal casing, and a top portion of the insulating rubber block is provided with an extracting portion protruding outwardly.

Furthermore, the storage slot is provided with a charging contact sheet connected to the control circuit board, and the charging contact sheet is in contact with the metal casing of the temperature probe for charging the portable battery.

Furthermore, control buttons connected to the control circuit board are provided on the front panel of the host, a battery compartment and a cover plate for covering the battery compartment are provided on a back side of the host, and the power supply device is a power supply battery arranged within the battery compartment.

Furthermore, a groove is provided on a back side of the host, and a supporting stand is axially connectedly arranged within the groove.

Furthermore, a bottom end of the temperature probe is formed as a pin portion with a reduced tube diameter.

Furthermore, a notch for hanging the host is formed in the centre of an upper portion on the back side of the host, and the notch is located above the groove.

Furthermore, a separating mechanism for isolating the insulating rubber block and the extracting portion is provided on an upper portion of the metal casing. The separating mechanism includes a mounting sleeve, a slider, a baffle, a hinge and a magnet. The mounting sleeves are slidably provided on the upper portion of the two metal casings and are made of iron material. The slider is slidably connected between the mounting sleeve and the metal casing on the same side, and the baffle is hingedly provided on an upper portion of the mounting sleeve through the hinge. The slider is moved upwardly to contact with the baffle, the magnet is provided at a bottom of the baffle, and the magnet and the mounting sleeve are magnetically attracted to each other.

Furthermore, a cleaning mechanism is provided at a bottom of the mounting sleeve. The cleaning mechanism includes a nut, a mounting block, and a cleaning brush. The nuts are provided on the bottom of the mounting sleeves respectively, two mounting blocks are connected to the bottoms of the nuts through threads, and the cleaning brush is placed between the two mounting blocks for cleaning the oil stains on the pin portion.

Furthermore, the mounting sleeve is provided with a fixing mechanism which includes a sliding sleeve, a guide rail, a connecting member, a universal positioning hose, a rotating shaft, a clamping block and a torsion spring. The sliding sleeves are provided on both the upper and lower sides of the mounting sleeve, the guide rail is slidably connected between the two sliding sleeves on the same longitudinal side, and the connecting member is connected between inner ends of the two guide rails. One end of the universal positioning hose is connected to a middle position of the connecting member, and the other end of the universal positioning hose is connected to the rotating shaft. Both sides of the rotating shaft are rotatably connected with the two clamping blocks and wounded with the torsion springs, and both ends of the torsion spring are respectively connected with the two clamping blocks on the same side.

Compared with the prior art, the beneficial effects of the present disclosure are:

1. The Bluetooth protocol is applied in the present disclosure for data transmission to get rid of the data cable, so that the temperature probe can be put into the oven, thus to improve the convenience of the product. Besides, the temperature data detected by the temperature measuring chip and the power data of the portable battery are shown on the digital display, which is convenient to observe the temperature of the barbecued food and the remaining power and charging state in real time, and the temperature detection is convenient.

2. The thermometer of the present disclosure is clamped on the barbecued rack by the clamping block, so that the mounting sleeve can be turned over together with the barbecued food, which can fix the pin portion and prevent the pin portion from accidentally falling off from the barbecued food and then breaking.

3. In the present disclosure, the mounting sleeve is arranged above the metal casing to achieve heat insulation effects, thus to prevent the insulating rubber block and the extracting portion from being burnt and stained with oil; the slider is moved upwardly to contact with the baffle for driving the baffle to swing upwardly, thereby driving the magnet to separate from the mounting sleeve, facilitating people to pull up the extracting portion, thus to pull out the pin portion from the barbecued food.

4. The temperature probe is connected with the host through the wireless signal, without downloading the client, and the temperature of barbecued food can be observed through the digital display in real time, without connecting to the client to observe the temperature data at any time, the operation is simple and convenient. In addition, the host is provided with the storage slot for accommodating the temperature probe, which is convenient to store and carry the host.

5. The storage slot can charge the portable battery in time while the temperature probe is accommodated, without additional USB or buttons for charging, so the charging is simple and convenient.

6. The cleaning brush can clean the oil stains on the pin portion in time, which is convenient for cleaning.

The appended aspects and advantages of the present disclosure will be partly given in the following description, some of which will become apparent in the following descriptions or appreciated from the practice of the present disclosure.

BRIEF DESCRIPTION OF THE DRAWINGS

In order to illustrate the embodiments of the present disclosure or the technical solutions in the prior art more clearly, the drawings used in the description of the embodiments or the prior art will be briefly introduce below. Apparently, the drawings in the following description are merely some embodiments of the present disclosure; for those of ordinary skill in the art, other drawings can be obtained based on these drawings without creative efforts.

DETAILED DESCRIPTION

The technical solutions in the embodiments of the present disclosure will be described clearly and completely hereafter. Apparently, the described embodiments are merely a part of the embodiments of the present disclosure, rather than all the embodiments. All other embodiments obtained by those of ordinary skill in the art based on the embodiments of the present disclosure without creative efforts shall fall within the protective scope of the present disclosure.

Figure 1:
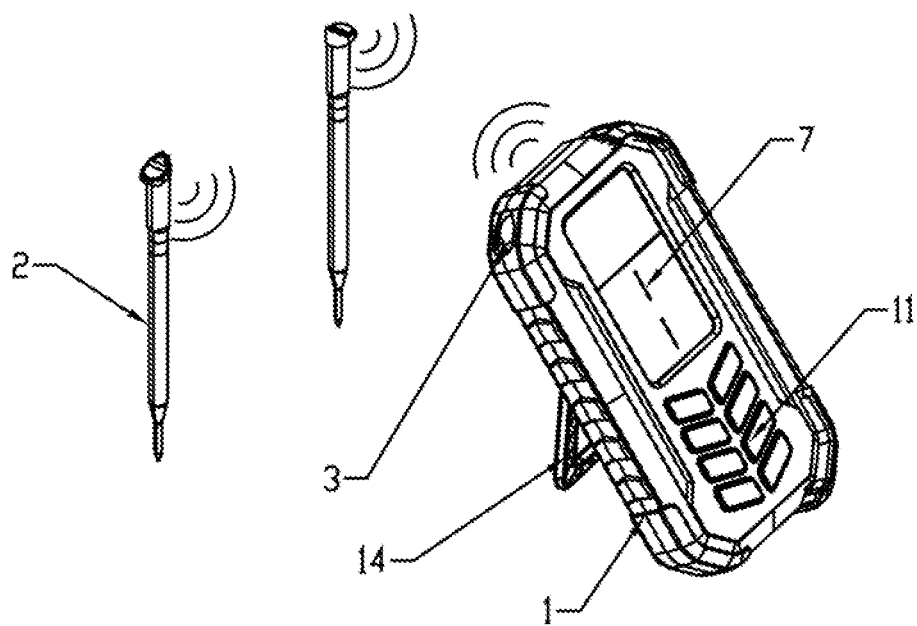
FIG. 1 is a schematic structural view according to the present disclosure.
Figure 2:
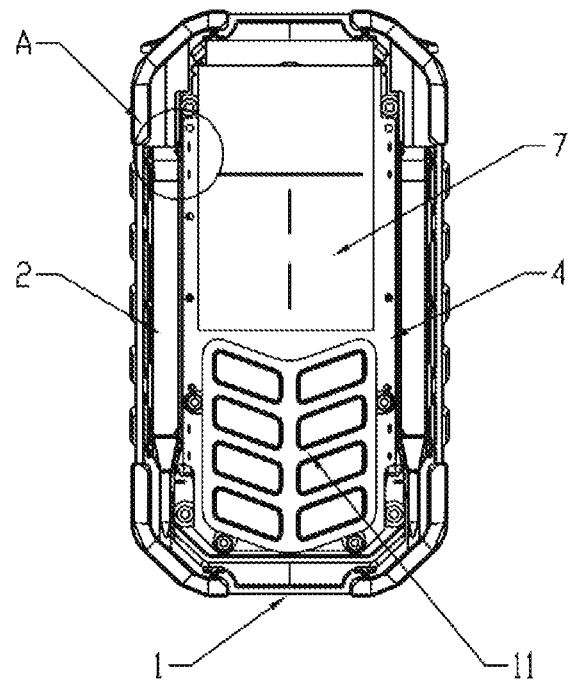
FIG. 2 is another schematic structural view according to the present disclosure.
Figure 3:
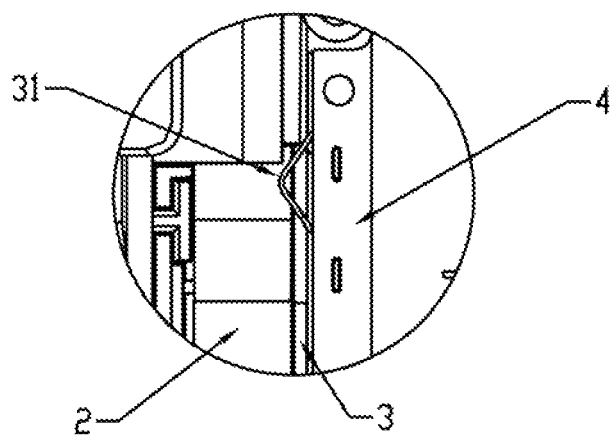
FIG. 3 is a partial enlarged view of part A in FIG. 2.
Figure 4:
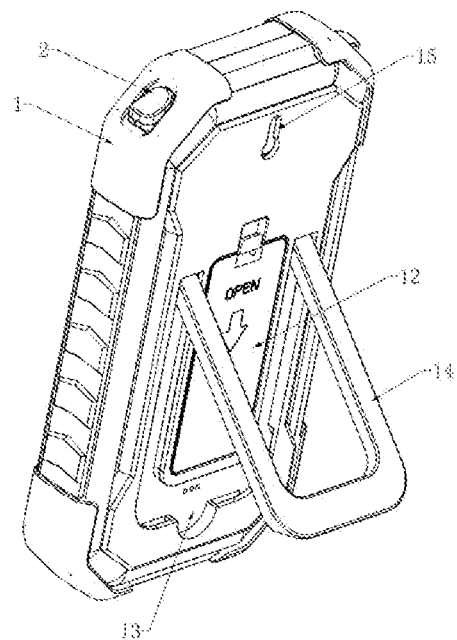
FIG. 4 is a further schematic structural view according to the present disclosure.
Figure 5:
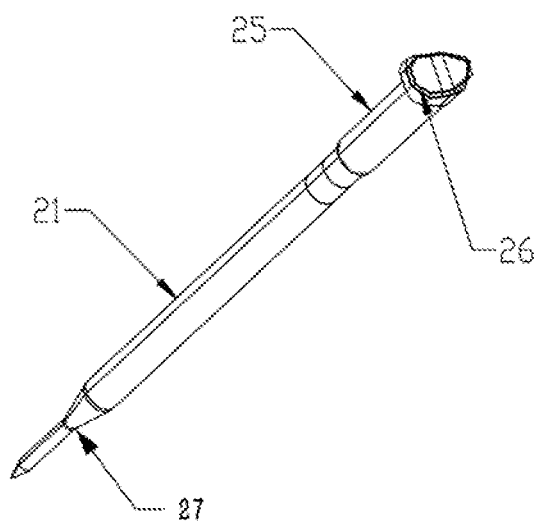
FIG. 5 is a schematic structural view of a temperature probe according to the present disclosure.
Figure 6:
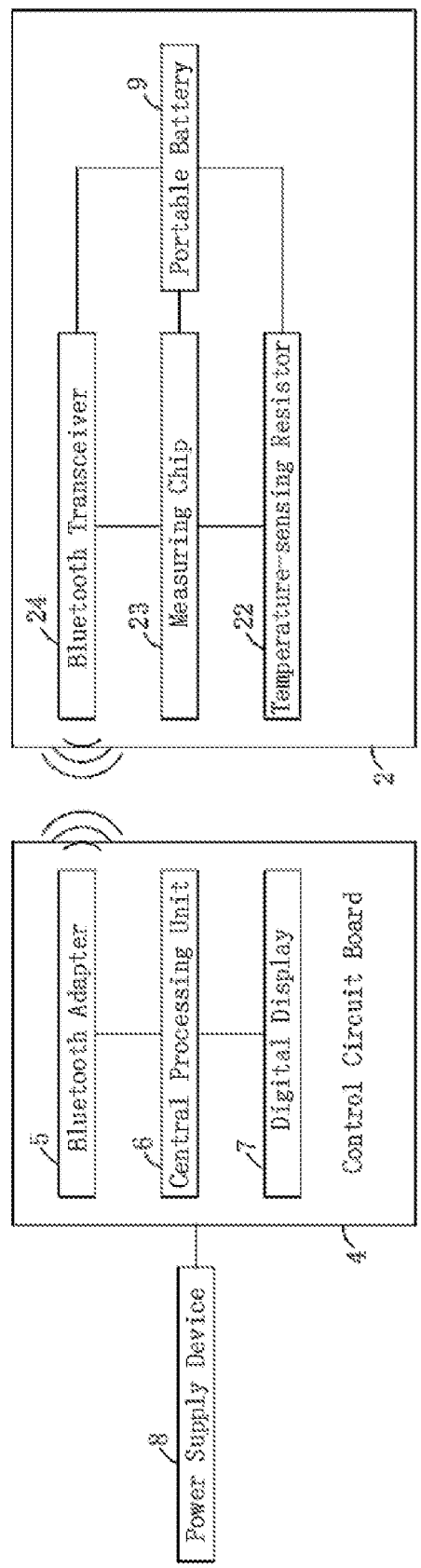
FIG. 6 is a schematic structural view of a system according to the present disclosure.
Figure 7:
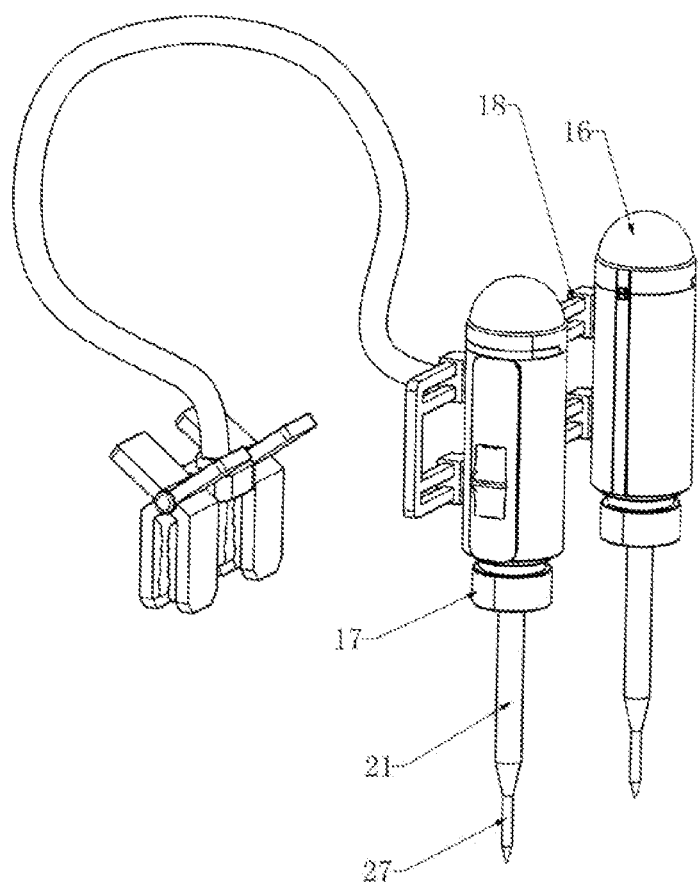
FIG. 7 is a schematic structural view of the temperature probe, a separating mechanism, a cleaning mechanism and a fixing mechanism according to the present disclosure.
Figure 8:
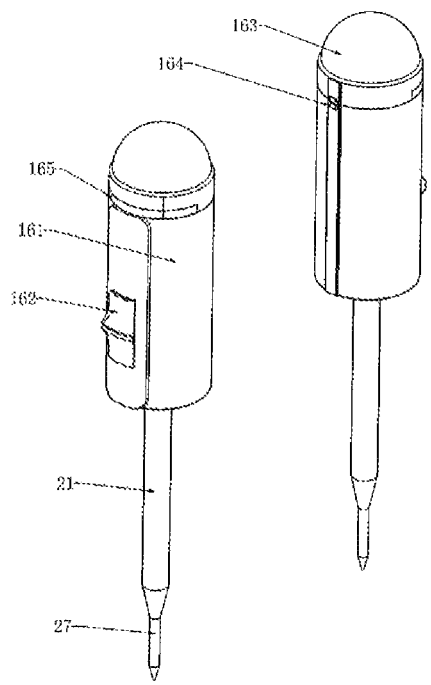
FIG. 8 is a schematic structural view of the separating mechanism according to the present disclosure.
Figure 9:
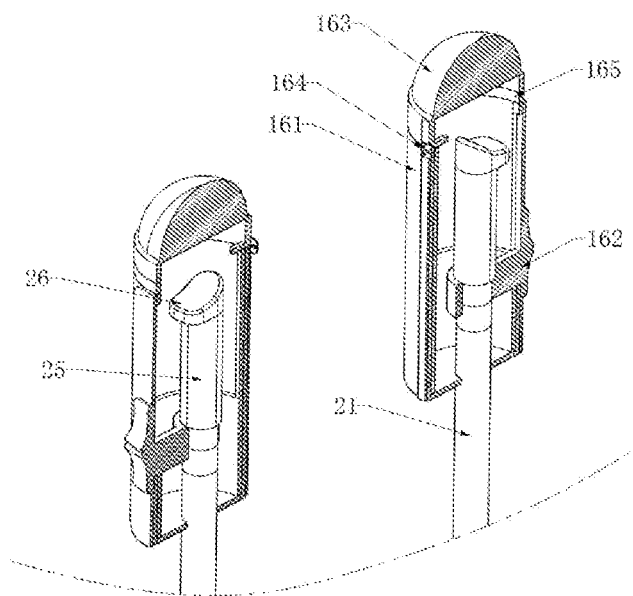
FIG. 9 is a cross-sectional view of the separating mechanism according to the present disclosure.
Figure 10:
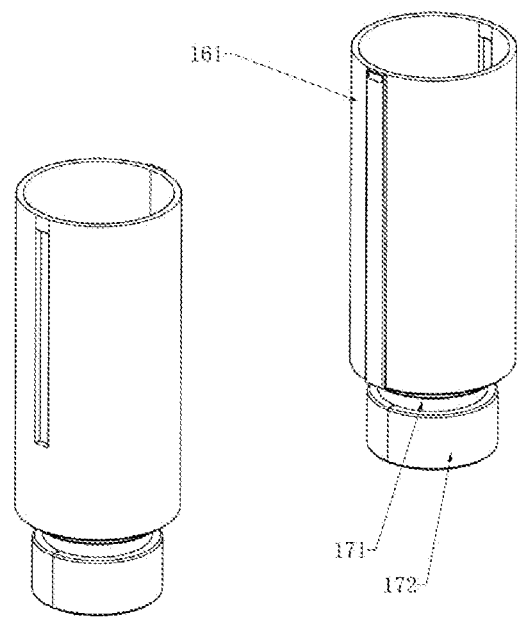
FIG. 10 is a schematic structural view of the cleaning mechanism according to the present disclosure.
Figure 11:
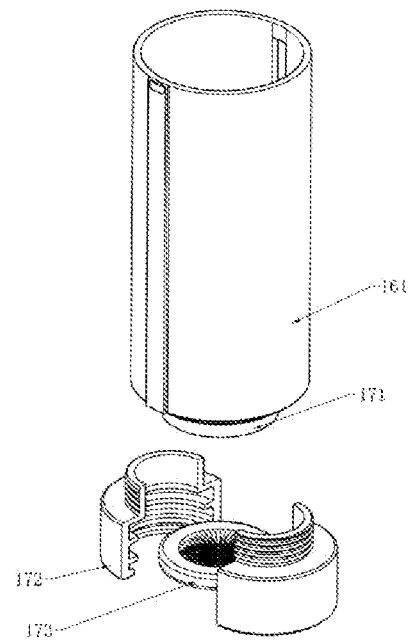
FIG. 11 is a disassembled structural view of the cleaning mechanism according to the present disclosure.
Figure 12:
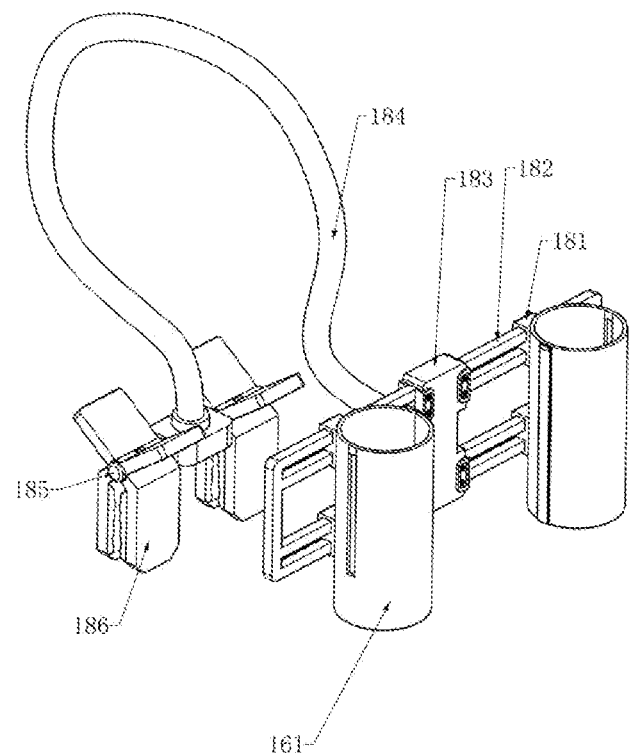
FIG. 12 is a schematic structural view of the fixing mechanism according to the present disclosure.
Figure 13:
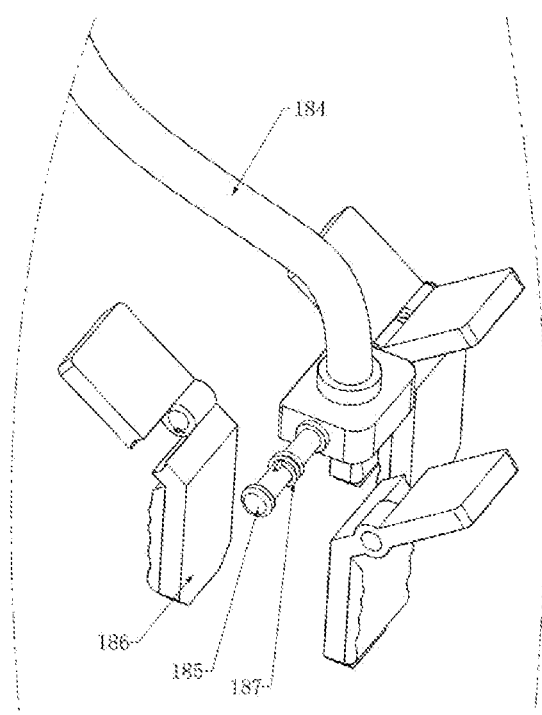
FIG. 13 is a disassembled structural view of the fixing mechanism according to the present disclosure.

Please refer to FIG. 1 to FIG. 13, a wireless detecting thermometer for barbecue comprises a host 1 and a temperature probe 2 matched with the host 1, and the temperature probe 2 is connected with the host 1 through a wireless signal. The host 1 is provided with a storage slot 3 for accommodating the temperature probe 2, which is convenient for storing, so that the host 1 can be carried with a user. The host 1 is provided with a control circuit board 4 that is integrated with a Bluetooth adapter 5, a central processing unit 6 and a digital display 7. The temperature probe 2 includes a thermally conductive metal casing 21, a temperature-sensing resistor 22 arranged in the metal casing 21, and a temperature measuring chip 23 connected to the temperature-sensing resistor 22. The temperature measuring chip 23 is connected with a Bluetooth transceiver 24 which is signally communicated with the Bluetooth adapter 5 in the host 1.

A power supply device 8 for supplying power to the control circuit board 4 is arranged within the host 1, a portable battery 9 connected to the temperature measuring chip 23 and the Bluetooth transceiver 24 is provided within the metal casing 21 of the temperature probe 2, and the digital display 7 is exposed on a front panel of the host 1. A Bluetooth protocol is applied in the present disclosure for data transmission to get rid of a data cable, so that the temperature probe can be put into an oven, thus to improve the convenience of the product. Besides, the temperature data detected by the temperature measuring chip 23 and the power data of the portable battery 9 are shown on the digital display 7, which is convenient to observe the temperature of the barbecued food and the remaining power and charging state in real time, and the temperature detection is convenient.

Furthermore, the storage slot 3 is provided with a charging contact sheet 31 connected to the control circuit board 4, and the charging contact sheet 31 is in contact with the metal casing 21 of the temperature probe 2 for charging the portable battery 9. The storage slot 3 can not only accommodate the temperature probe 2, but also charge the portable battery 9, without using additional USB or buttons for charging, and the operation is simple and convenient.

Furthermore, control buttons 11 connected to the control circuit board 4 are provided on the front panel of the host 1, and a battery compartment and a cover plate 12 for covering the battery compartment are provided on a back side of the host 1. The power supply device 8 is a power supply battery arranged within the battery compartment.

Furthermore, the back side of the host 1 is provided with a groove 13, a supporting stand 14 is axially connectedly arranged within the groove 13, and the supporting stand 14 can be pulled out to support and place the host 1 on a plane.

Furthermore, a bottom end of the temperature probe 2 is formed as a pin portion 27 with a reduced tube diameter. The tube diameter of the pin portion 27 is reduced, which is beneficial to increase the pressure and convenient to insert into the food for temperature detection.

Furthermore, a notch 15 for hanging the host 1 is formed in the centre of an upper portion on the back side of the host 1, and the notch 15 is located above the groove 13.

Furthermore, a separating mechanism 16 for isolating the insulating rubber block 25 and the extracting portion 26 is provided on an upper portion of the metal casing 21, wherein the separating mechanism 16 includes a mounting sleeve 161, a slider 162, a baffle 163, a hinge 164 and a magnet 165. The mounting sleeves 161 are slidably provided on the upper portion of the two metal casings 21 respectively. The mounting sleeves 161 are made of iron material and have heat insulation effects, which can prevent the insulating rubber block 25 and the extracting portion 26 from being burnt and stained with oil. The slider 162 is slidably connected between the mounting sleeve 161 and the metal casing 21 on the same side, and the baffle 163 is hingedly provided on an upper portion of the mounting sleeve 161 through the hinge 164. The slider 162 is moved upwardly to contact with the baffle 163, the magnet 165 is provided at a bottom of the baffle 163, and the magnet 165 and the mounting sleeve 161 are magnetically attracted to each other. The slider 162 is moved upwardly to contact with the baffle 163 to drive the baffle 163 to swing upwardly, so that the magnet 165 is separated from the mounting sleeve 161, which is convenient for people to pull up the extracting portion 26, thus the pin portion 27 can be pulled out from the barbecued food.

Furthermore, a cleaning mechanism 17 is provided at a bottom of the mounting sleeve 161. The cleaning mechanism 17 includes a nut 171, a mounting block 172, and a cleaning brush 173. The nuts 171 are provided on the bottom of the mounting sleeves 161 respectively, and two mounting blocks 172 are connected to the bottoms of the nuts 171 through threads. The cleaning brush 173 is placed between the two mounting blocks 172 for cleaning the oil stains on the pin portion 27.

Furthermore, the mounting sleeve 161 is provided with a fixing mechanism 18 which includes a sliding sleeve 181, a guide rail 182, a connecting member 183, a universal positioning hose 184, a rotating shaft 185, a clamping block 186 and a torsion spring 187. The sliding sleeves 181 are provided on both the upper and lower sides of the mounting sleeve 161, the guide rail 182 is slidably connected between the two sliding sleeves 181 on the same longitudinal side, and the connecting member 183 is connected between inner ends of the two guide rails 182. One end of the universal positioning hose 184 is connected to a middle position of the connecting member 183, and the other end of the universal positioning hose 184 is connected to the rotating shaft 185. Both sides of the rotating shaft 185 are rotatably connected with the two clamping blocks 186 and wounded with the torsion springs 187, and both ends of the torsion spring 187 are respectively connected with the two clamping blocks 186 on the same side. The clamping block 186 is clamped on the barbecued rack, so that the mounting sleeve 161 can be turned over together with the barbecued food.

For those of ordinary skill in the art, it is obvious that the present disclosure is not limited to the details of the above-mentioned exemplary embodiments, and the present disclosure can be implemented in other specific forms without departing from the spirit or basic features of the present disclosure. Therefore, from any point of view, the embodiments should be regarded as exemplary and non-restrictive. The scope of the present disclosure is defined by the appended claims rather than the above-mentioned descriptions, and therefore the meaning of equivalent elements of claims and all changes within the scope are included in the present disclosure.

What is claimed is:

1. A wireless detecting thermometer for barbecue, comprising a host and a temperature probe matched with the host, wherein the host is provided with a storage slot for accommodating the temperature probe, and a control circuit board integrated with a Bluetooth adapter, a central processing unit and a digital display; the temperature probe comprises a thermally conductive metal casing, a temperature-sensing resistor provided within the metal casing, and a measuring chip connected to the temperature-sensing resistor; the measuring chip is connected to a Bluetooth transceiver that is signally communicated with the Bluetooth adapter in the host;

a power supply device is arranged within the host for supplying power to the control circuit board; and a portable battery, connected to the measuring chip and the Bluetooth transceiver, is provided within the metal casing of the temperature probe, and the digital display is exposed on a front panel of the host; and a top end of the temperature probe is provided with an insulating rubber block connected to a top end of the metal casing, and a top portion of the insulating rubber block is provided with an extracting portion protruding outwardly.

2. The wireless detecting thermometer for barbecue according to claim 1, wherein the storage slot is provided with a charging contact sheet connected to the control circuit board, and the charging contact sheet is in contact with the metal casing of the temperature probe for charging the portable battery.

3. The wireless detecting thermometer for barbecue according to claim 1, wherein control buttons connected to the control circuit board are provided on the front panel of the host, a battery compartment and a cover plate for covering the battery compartment are provided on a back side of the host, and the power supply device is a power supply battery arranged within the battery compartment.

4. The wireless detecting thermometer for barbecue according to claim 1, wherein a groove is provided on a back side of the host, and a supporting stand is axially connectedly arranged within the groove.

5. The wireless detecting thermometer for barbecue according to claim 1, wherein a bottom end of the temperature probe is formed as a pin portion with a reduced tube diameter.

6. The wireless detecting thermometer for barbecue according to claim 4, wherein a notch for hanging the host is formed in the centre of an upper portion on the back side of the host, and the notch is located above the groove.

7. The wireless detecting thermometer for barbecue according to claim 1, wherein a separating mechanism for isolating the insulating rubber block and the extracting portion is provided on an upper portion of the metal casing, the separating mechanism includes a mounting sleeve, a slider, a baffle, a hinge and a magnet; the mounting sleeves are slidably provided on the upper portion of the two metal casings respectively and are made of iron material; the slider is slidably connected between the mounting sleeve and the metal casing on the same side, and the baffle is hingedly provided on an upper portion of the mounting sleeve through the hinge; the slider is moved upwardly to contact with the baffle, the magnet is provided at a bottom of the baffle, and the magnet and the mounting sleeve are magnetically attracted to each other.

8. The wireless detecting thermometer for barbecue according to claim 7, wherein a cleaning mechanism is provided at a bottom of the mounting sleeve, the cleaning mechanism includes a nut, a mounting block, and a cleaning brush; the nuts are provided on the bottom of the mounting sleeves respectively, two mounting blocks are connected to the bottoms of the nuts through threads, and the cleaning brush is placed between the two mounting blocks for cleaning the oil stains on the pin portion.

9. The wireless detecting thermometer for barbecue according to claim 8, wherein the mounting sleeve is provided with a fixing mechanism which includes a sliding sleeve, a guide rail, a connecting member, a universal positioning hose, a rotating shaft, a clamping block and a torsion spring; the sliding sleeves are provided on both the upper and lower sides of the mounting sleeve, the guide rail is slidably connected between the two sliding sleeves on the same longitudinal side, and the connecting member is connected between inner ends of the two guide rails; one end of the universal positioning hose is connected to a middle position of the connecting member, and the other end of the universal positioning hose is connected to the rotating shaft; both sides of the rotating shaft are rotatably connected with the two clamping blocks and wounded with the torsion springs, and both ends of the torsion spring are respectively connected with the two clamping blocks on the same side.

* * * * *